Patented Oct. 23, 1923.

1,471,751

UNITED STATES PATENT OFFICE.

HARRY D. RANKIN, OF OAKLAND, CALIFORNIA, ASSIGNOR OF SEVEN-TENTHS TO LOUIS SLOSS, OF SAN FRANCISCO, CALIFORNIA.

PROCESS OF DECOMPOSING, TRANSPOSING, DISSOLVING, OR RENDERING SOLUBLE DIFFICULTLY-SOLUBLE BODIES.

No Drawing.    Application filed June 26, 1918. Serial No. 242,124.

*To all whom it may concern:*

Be it known that I, HARRY D. RANKIN, a citizen of the United States, and a resident of Oakland, county of Alameda, and State of California, have invented a certain new and useful Process of Decomposing, Transposing, Dissolving, or Rendering Soluble Difficultly-Soluble Bodies, of which the following is a specification.

The invention relates to a process of decomposing, transposing, dissolving, internally rearranging or rendering soluble difficultly soluble or commercially insoluble bodies, such as metals, ores, minerals, concentrates, slimes, waste material or other bodies, whether in the raw state or in the roasted, fused, leached or otherwise treated state.

An object of the invention is to produce a commercial process for internally rearranging, decomposing, transforming, dissolving or rendering soluble, materials or bodies which are difficultly soluble or commercially insoluble.

A further object of the invention is to provide a process for accomplishing the above results in a short time and at a relatively small expense.

The invention possesses other advantageous features, some of which, with the foregoing, will be outlined in full in the following description, where I shall describe that species of the invention which I have selected for description. While I shall describe one specific form of my generic invention, it is to be understood that I do not limit myself to such form, because the invention may be embodied in a multiplicity of forms, each being a species of my invention.

By the process of my invention I transform, decompose, dissolve or render soluble, bodies in the natural state heretofore considered technically insoluble in sulfuric, hydrochloric or nitric acid or combinations thereof, such as magnetic oxide of iron ($Fe_3O_4$), tin dioxide ($SnO_2$), all manganese oxides ($Mn_2O_3$), ($MnO_2$) etc., chromite ($FeOCr_2O_3$), silicates of copper, of nickel, of zinc, of potassium and of other metals, barium sulfate ($BaSO_4$), cinnabar (HgS) and other sulfides, as well as ignited, sintered, roasted, melted, smelted, leached or otherwise treated ores or substances, such as ignited ferric oxide, ignited alumina, ferrites, alloys. certain molecular compounds and other unusual and difficultly soluble bodies, all classes of which have heretofore been considered as practically insoluble.

The material which I employ for transforming, dissolving or rendering soluble difficultly soluble bodies, is an alkali, preferably an hydroxide, a carbonate, or an acid carbonate such as sodium hydroxide, sodium carbonate or acid sodium carbonate, but it is to be understood that other alkali or alkaline earth hydroxides, carbonates or acid carbonates may be employed. The action of these alkali materials or a selected one of them is to replace the weaker base in the substance being treated by the action of the stronger base, thereby transforming the substance or the desired ingredients thereof into soluble form.

The substance to be treated is first preferably ground into a finely divided form and is mixed with the requisite quantity of dry powdered alkali reagents and sufficient water is added, so that after reaction occurs the mass is moist. The mixture is then charged into a closed receptacle and heated to the necessary high temperature, that is to a dark red or even brighter color, at which time reaction occurs. Heating the mass in a closed vessel produces a pressure within the vessel which is essential to the reaction. A pressure of between 20 and 60 pounds to the square inch is essential, but often much higher pressures are produced. While this condition of temperature and pressure is maintained, the mixture is preferably agitated to bring all of the material under the necessary conditions by preventing agglomeration, but agitation is not essential.

The alkali reagent or reagents are preferably added in the requisite molecular quantity to replace all of the weaker base in the substance being treated and this quantity varies with different substances and may be determined by analysis.

The action of the alkali hydroxide, under the conditions of temperature and pressure is to decompose the substance in such a way that alkali salts are formed and the metals in the substance are converted to hydroxides, which are readily recoverable.

I claim:

1. The process of decomposing, transforming, dissolving or rendering soluble, heretofore considered practically insoluble substances which consists in heating to redness and subjecting to pressure a mixture of the substance and an alkali.

2. The process of decomposing, transforming, dissolving or rendering soluble, heretofore considered practically insoluble substances which consists in heating to redness in a closed vessel a mixture of the substance, an alkali and water.

3. The process of decomposing, transforming, dissolving or rendering soluble, heretofore considered practically insoluble substances which consists in heating to redness in a closed vessel a mixture of the substance and an alkali capable of replacing the base of the substance under the conditions of temperature and pressure.

4. The process of decomposing, transforming, dissolving or rendering soluble, heretofore considered practically insoluble substances which consists in heating to redness in a closed vessel a mixture of the substance and a reagent possessing strong hydroxidion properties.

5. The process of decomposing, transforming, dissolving or rendering soluble, heretofore considered practically insoluble substances which consists in heating to redness in a closed vessel a mixture of the substance and an alkali hydroxide.

6. The process of decomposing, transforming, dissolving or rendering soluble, heretofore considered practically insoluble substances which consists in heating to redness in a closed vessel a mixture of the substance, a reagent possessing strong hydroxidion properties and a liquid.

In testimony whereof, I have hereunto set my hand at San Francisco, California, this 17th day of June 1918.

HARRY D. RANKIN.

In presence of—
H. G. PROST.